United States Patent Office 2,777,071
Patented Jan. 8, 1957

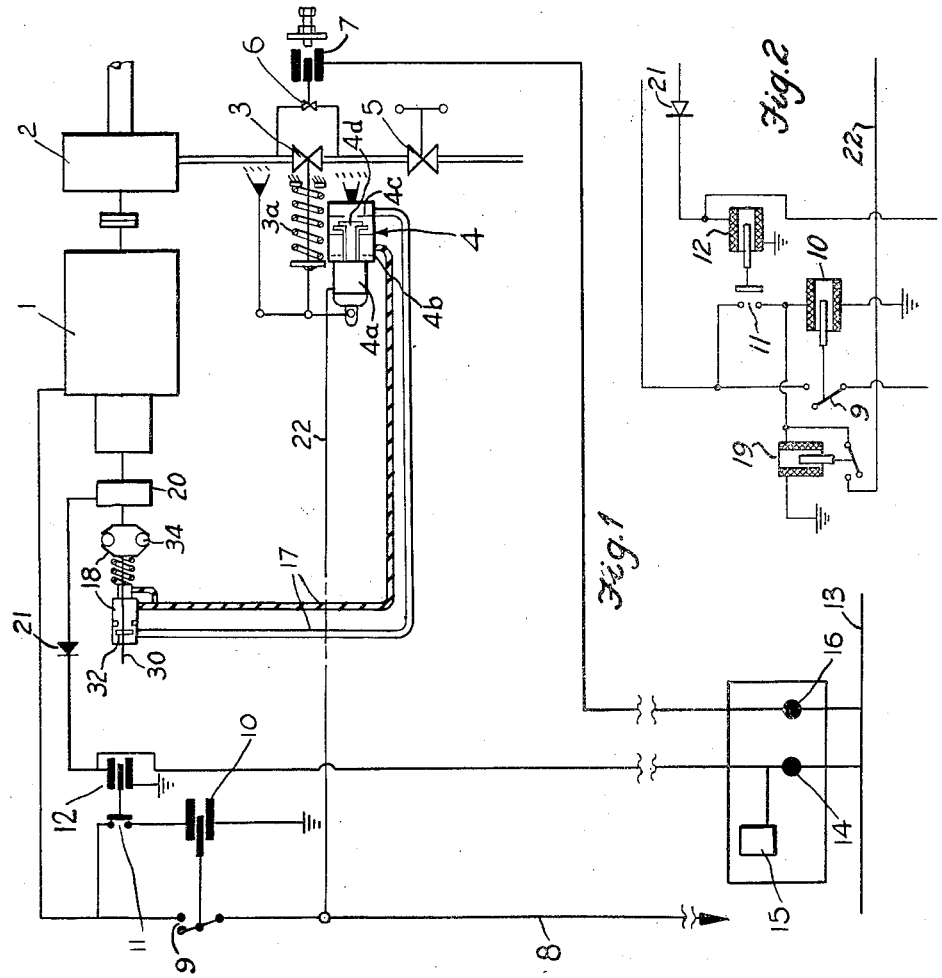

2,777,071

ELECTRIC GENERATING EQUIPMENT

William Scrymgeour Ross, Rugby, England, assignor to The British Thomson-Houston Company Limited, a British company Application April 26, 1955, Serial No. 503,951

Claims priority, application Great Britain April 26, 1954

5 Claims. (Cl. 290—40)

This invention relates to electric generating equipment consisting of a generator and a prime mover driving the generator, and has for its main object to provide simple and reliable apparatus which can be controlled with a minimum of supervision.

A further object is to provide a generating equipment which is remotely controllable.

A still further object is to provide an electric generating equipment which can be started into operation and stopped by the simple closure and opening of electric switches.

Electric generating equipment according to the invention comprises a generator driven by a prime mover the supply of working fluid to which is controlled by a main valve which is by-passed to provide for a limited supply of working fluid to be admitted to the prime mover for starting purposes, the opening of the main valve being controlled by an electric actuator energised from the output of the generator, so that the main valve is only operable to its fullest extent when the generator voltage has, or has nearly, reached its operational value.

The electric actuator may include an hydraulic servo device or pump and preferably is of the character described and claimed in prior Patent No. 2,036,798. Such a device consists of a pump driven at a constant speed by an electric motor to effect operation of a piston, the movement of which effects operation of the main valve. The device as described in the above-mentioned specification is, however, modified, so that pressure on either side of the piston can be controlled in order to control the effective pressure thereon by means of a by-pass valve located in a conduit connecting the spaces in the cylinder on opposite sides of the piston, the opening of the by-pass valve being determined by a speed controlled device driven from the prime mover. Thus, as the speed of the prime mover, and thus of the generator, increases, the by-pass valve is opened in order to reduce the differential pressure on the piston and causes the main valve of the prime mover to be operated in a closing direction, thereby controlling the speed of the prime mover.

The generating equipment may be started into operation by the energisation of a relay controlling the starting valve which by-passes the main valve controlling the admission of working fluid to the prime mover. The prime mover is thus brought up to speed by working fluid admitted through the by-pass valve and when synchronous speed is reached, the voltage generated by the generator is utilised to operate a relay controlling the main circuit breaker which connects the output for the generator to the line. The motor driving the electro-hydraulic actuator may be supplied from the line side of the circuit breaker so that it is actuated to open the main valve when the circuit breaker closes; preferably, however, it is supplied directly from the output of the generator so that the main valve is fully open before the circuit breaker is closed to connect the generator to the line.

In order that the invention may be more readily understood, one embodiment of the same will be diagrammatically illustrated in the accompanying drawings wherein Fig. 1 shows a prime mover generator system including control apparatus therefor and Fig. 2 shows circuitry for an alternative control arrangement.

Referring to Fig. 1 of the drawings, the generator of the equipment is shown at 1 and is driven by a prime mover 2 which is conveniently constituted by an elastic fluid turbine. The prime mover receives its supply through a main valve 3, the operation of which is controlled by an electro-hydraulic actuator 4 comprising a motor 4a, a cylinder 4b, a piston operating in said cylinder 4c and a pump 4d actuated by said motor. An isolating valve 5 is preferably provided in order to shut off the supply of working fluid to the prime mover independently of the main valve 3. The main valve 3 is by-passed by a starting valve 6 controlled by a relay 7 although manual operation may be resorted to if desired.

The generator supplies its output current to the line 8 through a circuit breaker 9 operated through an electromagnetic relay 10 which derives its energising current from the generator side of the circuit breaker 9 through tripping contacts 11 adapted to open the circuit through the relay 10 should the speed of the generator exceed a safe value.

The contacts 11 form part of a relay 12 adapted to be energised from an auxiliary source of supply connected to bus-bar 13 through a "stop" switch 14, the relay 12 when energised, opening its contacts 11.

A control or tachometer generator 20, which is driven by the generator 1 and the voltage of which varies in dependence on the speed of the generator 1, energises relay 12 under over-speed conditions, a rectifier 21 being included in the connection to prevent the generator 20 forming a conductive path for the current from bus-bar 13. When push-button 14 is open, the voltage of generator 20 is indicated by a meter 15 the reading of which may be used as a remote indicating device of the speed of the generator 1.

The starting relay 7 is also energised from the auxiliary supply to bus-bar 13 through a "start" switch 16.

The electro-hydraulic actuator 4 is of the by-pass control character. The by-pass is controlled by a pair of conduits 17, the passage of fluid through which is controlled by a governing device 18 driven from the shaft of the generator or prime mover. Governing device 18 comprises a slidable valve shaft 30 which moves to open valve 32 against the bias of the valve spring when fly balls 34 move outward due to centrifugal force.

In order to start up the equipment "start" switch 16 is closed to energise starting relay 7 to open starting valve 6. The equipment then runs up to speed and as the generator voltage rises to its operational value, the operating coil 10 of the main circuit breaker 9 picks up, closing its contacts and connecting the generator to the line 8. Simultaneously with the closing of circuit breaker 9 the motor 4a driving the electro-hydraulic actuator 4 is energised through conductor 22 to open the main valve 3 against the bias of spring 3a; thereafter the opening of the valve is controlled by the differential pressure developed on the piston of the actuator 4, as determined by the speed of the equipment through control device 18.

An alternative arrangement which may be employed when there is danger of the circuit breaker being closed on to a load which would cause stalling of the generator, is to utilise a separate relay 19 for controlling the connection of the electro-hydraulic actuator 4 to the generator side of the circuit breaker through conductors 22, the relay 19 being set to pick-up at a voltage below that of the line so that the main valve is fully opened before the circuit breaker is closed to connect the generator to the line. This alternative arrangement is illustrated by the connections shown in Fig. 2.

In order to shut down the equipment, the stop switch 14 is closed to energise relay 12 and open its contacts 11 to de-energise operating coil 10 of the circuit breaker, causing the contacts 9 of the latter to open. This would also open relay 19 (used in the alternative arrangement) and de-energise device 4 to close the main valve.

What I claim as new and desire to secure by Letters Patent of the United States is:

1. Electric generating equipment comprising a generator, a prime mover coupled to the generator, a main valve for controlling the supply of working fluid to the prime mover, a by-pass valve for controlling the supply of a limited quantity of working fluid to the prime mover for starting purposes, electric actuator means for opening said main valve, a load circuit, a circuit breaker for connecting the output of said generator to said load circuit, means responsive to the output voltage of said generator for closing said circuit breaker when the output of the generator has risen to a predetermined value and means for energising said electric actuating means from said load circuit whereby said main valve is operable to its fullest extent only when the voltage of said generator has substantially reached its operating value and said circuit breaker has closed to connect said generator to said line.

2. Electric generating equipment comprising a generator, a prime mover coupled to the generator, a main valve for controlling the supply of working fluid to the prime mover, a by-pass valve for controlling the supply of a limited quantity of working fluid to the prime mover for starting purposes, electro-hydraulic actuating means for effecting opening of said main valve, said electro-hydraulic actuating means comprising an electric motor, a fluid pump driven by said motor, and a piston operating in a cylinder to which fluid from said pump is supplied, means operatively connecting said piston to said main valve, spring means for closing said main valve, means responsive to the voltage of said generator for connecting said motor to the output of said generator when the voltage of said generator has substantially reached its operating value, whereby said main valve is operable to its fully open position only when the voltage of said generator has substantially reached its operating value.

3. Electric generating equipment according to claim 2 having valve means by-passing around said piston, fluid supplied to said cylinder from said pump, speed responsive means responsive to the speed of said generator and means controlling the opening of said by-pass valve means from said speed responsive means, whereby said main valve is adjusted to render the speed of said prime mover substantially constant.

4. Electric generating equipment comprising a generator, a prime mover coupled to the generator, a main valve for controlling the supply of working fluid to the prime mover, a by-pass valve for controlling the supply of a limited quantity of working fluid to the prime mover for starting purposes, electro-hydraulic actuating means for effecting opening of said main valve, said electro-hydraulic actuating means comprising an electric motor, a fluid pump driven by said motor, and a piston operating in a cylinder to which fluid from said pump is supplied, means operatively connecting said piston to said main valve, spring means for closing said main valve, a load circuit, a circuit breaker for connecting said generator to said load circuit, electro-magnetic means for operating said circuit breaker, said electro-magnetic operating means being energised from said generator whereby to close said circuit breaker when the voltage of said generator has substantially reached its operating value, a tachometer generator driven by said prime mover, relay means responsive to the output of said tachometer generator and adapted when energised to open the energising circuit for said electro-magnetic operating means of said circuit breaker, whereby said circuit breaker opens in response to a speed in excess of a predetermined value of said prime mover.

5. Electric generating equipment as claimed in claim 4 having a stop switch for energising said relay means whereby to open said circuit breaker in response to closure of said stop switch.

References Cited in the file of this patent

UNITED STATES PATENTS

| 1,202,210 | Okey | Oct. 24, 1916 |
| 1,378,514 | Gergman | May 17, 1921 |
| 1,786,063 | Gumpper | Dec. 23, 1930 |
| 1,863,396 | Woods | June 14, 1932 |
| 1,866,334 | Woods | July 5, 1932 |
| 1,867,393 | Woods | July 12, 1932 |
| 1,901,620 | Woods | Mar. 14, 1933 |
| 1,902,480 | Woods | Mar. 21, 1933 |
| 1,993,613 | Lum | Mar. 5, 1935 |
| 2,036,798 | Dreisch | Apr. 7, 1936 |
| 2,348,042 | Warren | May 2, 1944 |